Dec. 31, 1940.   E. B. MALLORY   2,227,099
METHOD FOR SETTLING AND FILTERING SEWAGE LIQUORS
Filed April 23, 1936
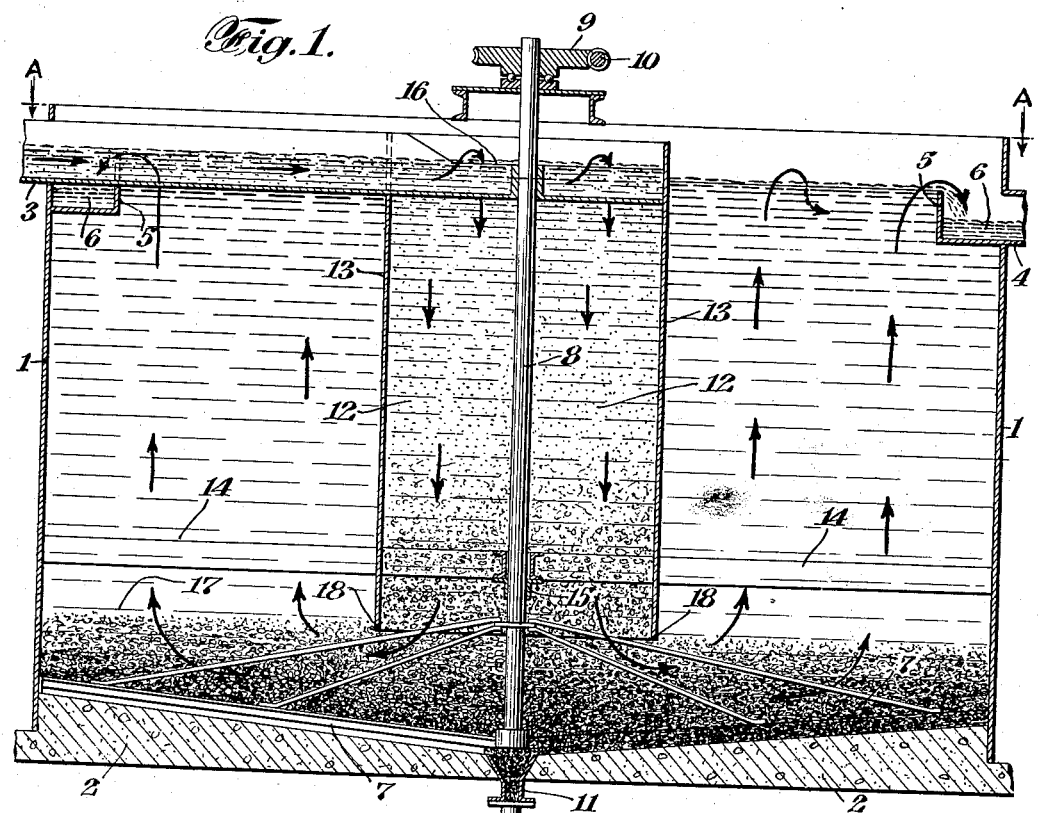
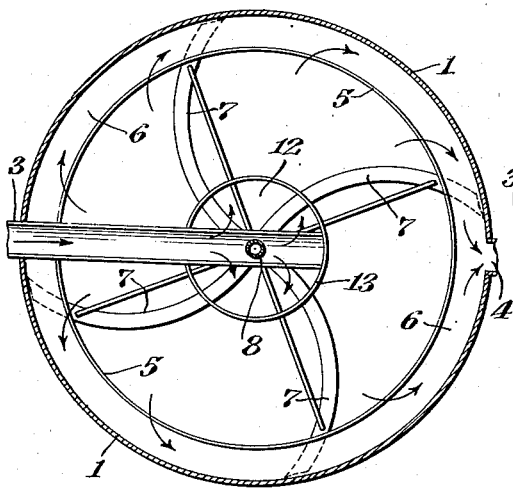
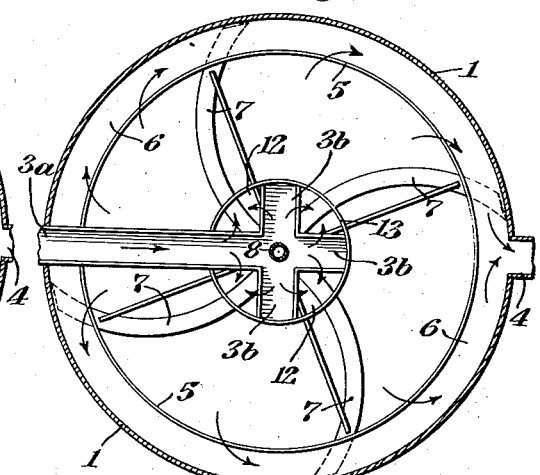
INVENTOR
Edward B. Mallory
BY
Ward, Crosby & Neal
ATTORNEYS Patented Dec. 31, 1940

2,227,099

UNITED STATES PATENT OFFICE 2,227,099

METHOD FOR SETTLING AND FILTERING SEWAGE LIQUORS

Edward B. Mallory, Tenafly, N. J.

Application April 23, 1936, Serial No. 75,951

2 Claims. (Cl. 210—5)

In the treatment of sewage by various oxidation or chemical precipitation processes such as the so-called "activated sludge process," as in Jones Patent No. 1,282,587, dated October 22, 1918, the chemical precipitation process, as in Gleason and Loonan Patent No. 1,886,267, dated April 18, 1932, or the "oxidized sludge" process, as in my copending application Ser. No. 668,217, filed April 27, 1933, entitled "Oxidized sludge sewage treatment process," an important final step consists in passing the so-called sewage mixed liquor into a settling chamber or clarifier in the lower portion of which a sludge blanket is formed and maintained, and from which chamber the purified effluent is discharged.

The present invention relates primarily to the above mentioned step in sewage treatment and is intended to maintain conditions in the settling chamber under which the sludge blanket therein may act efficiently as a filtering medium for the incoming mixed liquor, resulting in a more highly purified effluent, and the production of sludge of superior characteristics for the performance of its desired functions when recirculated for admixture with the incoming sewage prior to the aeration step customarily used in processes of the above character.

According to the present invention I employ, in connection with the settling chamber, what may be termed a preliminary mixed liquor receiving chamber of such character, as hereinafter explained in greater detail, as to promote the formation and maintenance in the lower portion of the settling chamber, of a sludge filtering medium having qualities which enable it to act effectively as a filtering medium, the mixed liquor being delivered from this receiving chamber into the main settling compartment, at a relatively low velocity and at a level which is at or below the normal level of the upper surface of the sludge blanket in the settling chamber.

Further objects and advantages of the invention will be in part obvious and in part specifically referred to in the description hereinafter contained which, taken in conjunction with the accompanying drawing, discloses the invention as carried out by a preferred form of apparatus. Such disclosure, however, should be regarded as merely illustrative of the principles of the invention. In the drawings—

Fig. 1 is a central vertical section, somewhat diagrammatic, through an apparatus adapted to be used in carrying out the invention.

Fig. 2 is a horizontal section on line A—A of Fig. 1, looking in the direction of the arrows.

Fig. 3 is a view similar to Fig. 2 but illustrating an apparatus somewhat modified in respect to the conduits used for conducting the mixed liquor to the preliminary mixed liquor receiving chamber.

In the drawing I have shown a settling chamber constituted by the tank 1, which may be for example of steel construction and supported upon a concrete foundation 2. The sewage mixed liquor to be clarified comes in through an intake conduit 3, and the purified effluent is discharged through an offtake conduit 4. The settling chamber may be provided with an annular weir or lip 5 over which the effluent flows into an annular channel 6 which communicates with the offtake conduit 4. A sludge scraper 7 may be provided at the bottom of settling chamber 1, and suitably driven as by means of an upwardly extending rotary stem 8 which is in turn driven by suitable gears 9 and 10 at the top, sludge being drawn off at the bottom either continuously or intermittently as desired through a pipe 11. The above mentioned parts associated with the settling chamber being more or less conventional in their nature, will not be described in greater detail herein.

Between the intake conduit 3 and the main settling chamber 1, I interpose a preliminary mixed liquor receiving chamber 12 which in the specific apparatus illustrated, is constituted by the cylindrical steel partition wall 13 enclosed within tank 1 and supported in a suitable manner at the top and by the radial cross-braces 14 which may also include a steady bearing 15 for stem 8 of the sludge scraper. The upper end of partition wall 13 extends somewhat above the level of the liquid in tank 1, and as shown in Figs. 1 and 2, the intake channel 3 extends diametrically across the upper end of preliminary receiving chamber 12, its walls being cut away as indicated at 16 in Fig. 1, to distribute the incoming mixed liquor fairly uniformly throughout the upper end of chamber 12. In Fig. 3 the intake channel 3a is of somewhat ramified form, being provided with branch channels 3b, which further increase the uniformity of distribution of the mixed liquor to different parts of the surface of preliminary chamber 12.

In the operation of the apparatus, a sludge blanket as indicated at 17 in Fig. 1 will be maintained in the lower portion of the main settling chamber. The level of the upper surface of this sludge blanket may vary somewhat under different operating conditions, but the lower end 18 of the partition wall 13 will project down to a point in the lower portion of tank 1 which is somewhat below the normal upper surface of sludge blanket 17. Thus the preliminary mixed liquor receiving chamber 12 opens into the main settling chamber at or below the normal upper surface level of the sludge blanket, thereby compelling the mixed liquor and the solid and colloidal particles contained therein to pass through the sludge blanket 17 before the purified effluent reaches the upper portion of the main settling compartment.

The preliminary mixed liquor receiving chamber 12 is in other respects so constructed and coordinated with the main settling chamber as to promote the formation and maintenance of a mass of sludge in and about the lower end of chamber 12, of such character and quality as to be capable of acting effectively as a filtering medium for the incoming mixed liquor. For this purpose I have found it to be important that the concentration of the suspended solids in the upper stratum of the sludge blanket formed at the lower end of chamber 12 (usually measured in parts per million by weight) should be of the order of from one and a half to two times the concentration of the suspended solids in the incoming mixed liquor. The sludge about the mouth of chamber 12 will have little or no efficacy as a filtering medium, if its concentration of suspended solids falls below the ratio above mentioned.

A number of considerations enter into the maintenance of a sludge blanket of the above character. In the first place, it is necessary that the preliminary mixed liquor receiving chamber 12 be many times larger in cross sectional area than the intake conduit 3, and of substantial volume as compared to the volume of the main settling chamber 1. In fact a suitable ratio between the volume of the preliminary chamber 12 and the volume of settling chamber 1 may be selected empirically according to the formula—

$$P = \frac{C}{4A - 4C}$$

wherein

P = ratio of liquid holding capacity of preliminary chamber 12 to total liquid holding capacity of settling chamber 1 plus preliminary chamber 12.

A = volumetric liquid holding capacity of aerator associated in same cycle.

C = total volumetric liquid holding capacity of settling chamber 1 plus preliminary chamber 12.

A suitable depth of penetration of the preliminary mixed liquor receiving chamber 12 into the main settling chamber 1 may also be determined empirically by the following equation:

$$\frac{\text{Liquid depth of chamber 12}}{\text{Liquid depth of chamber 1}} (\text{in} \%) = \frac{100}{\frac{2a}{c} - 1}$$

where $a$ = volumetric holding capacity of the plant aerator in gallons.

$c$ = volumetric holding capacity of chamber 1 plus chamber 12 in gallons.

As the solid particles settle out from the mixed liquor, they appear to pass successively through a number of stages; in the early stages of settling, the solids concentration of the sludge blanket formed is relatively low and the particles exhibit little surface viscosity, but as settling continues the solids concentration of the sludge blanket increases and the surfaces of the particles acquire a more viscous character whereby they are capable of acting efficiently to absorb and agglomerate more solids and colloidal material from the mixed liquor, as it passes through the sludge blanket as above described. Usually it will be found advisable to employ a detention time of the sludge in the settling chamber which is not substantially less than one hour, since if the settling stage progresses too rapidly the flocs in the sludge tend to become less viscous permitting suspended matter to pass out with the effluent.

A preliminary mixed liquor receiving chamber of the character above described promotes the formation and maintenance of sludge of proper quality about the mouth of chamber 12 at its bottom, and the incoming liquor passes downwardly into the sludge blanket, then out laterally, and then turns upwardly leaving flocculent and colloidal suspended matter entrapped within the sludge blanket. During the passage of the mixed liquor through the sludge blanket greatly increased quantities of finely divided and colloidal suspended particles will be filtered out, since these particles are largely of a character and degree of oxidation which would not normally cause them to settle to the floor of the tank in the limited period of time during which the liquid remains in the tank. If the solids concentration of the sludge about the mouth of chamber 12 materially exceeds the ratio above referred to, excessive velocities of flow are introduced in the filtering zone, which interferes with the proper progress of the filtering and settling operations.

While the invention has been described as carried out by means of a specific apparatus it should be understood that many changes may be made therein without departing from the principles of the invention in its broader aspects, and within the scope of the appended claims.

I claim:

1. The method of settling and filtering aerated sewage mixed liquor which includes maintaining a sludge blanket in the lower portion of a settling chamber, passing mixed liquor downwardly through a preliminary mixed liquor receiving chamber, retaining suspended solids of such mixed liquor within said receiving chamber until the suspended solids concentration at the bottom portion of said receiving chamber is of the order of one and a half to two times the suspended solids concentration of the mixed liquor entering the receiving chamber, passing the mixed liquor from the bottom portion of said receiving chamber into said sludge blanket to filter out suspended solids into said blanket, and withdrawing clarified effluent from the upper portion of said settling chamber.

2. The method of settling and filtering aerated sewage mixed liquor which includes maintaining a sludge blanket in the lower portion of a settling chamber, passing mixed liquor downwardly through a preliminary mixed liquor receiving chamber, retaining suspended solids of such mixed liquor within said receiving chamber until the suspended solids concentration at the bottom portion of said receiving chamber is of the order of one and a half to two times the suspended solids concentration of the mixed liquor entering the receiving chamber, passing the mixed liquor radially outward from the bottom portion of said receiving chamber into said sludge blanket to filter out suspended solids into said blanket, progressively moving the sludge in said blanket inwardly toward the mixed liquor passing into the sludge blanket, withdrawing clarified effluent from the upper portion of said settling chamber and drawing off sludge from the bottom of said blanket at a portion thereof which is substantially directly underneath the mixed liquor passing from the receiving chamber into the sludge blanket as aforesaid.

EDWARD B. MALLORY.